United States Patent [19]
Schmieder

[11] 3,888,025
[45] June 10, 1975

[54] TEACHING GAME

[76] Inventor: Drucilla Schmieder, 4180 Pontatoc Rd., Tucson, Ariz. 85718

[22] Filed: Jan. 9, 1974

[21] Appl. No.: 431,956

[52] U.S. Cl. ............ 35/35 H; 35/8 A; 35/73; 273/157 R
[51] Int. Cl. ............ G09b 5/04; A63f 9/10
[58] Field of Search ......... 35/35 R, 35 H, 35 J, 8 A, 35/69, 70, 71, 72, 73; 273/156, 157 R, 157 A

[56] References Cited
UNITED STATES PATENTS

| | | | |
|---|---|---|---|
| 723,425 | 3/1903 | Thompson | 35/69 |
| 760,384 | 5/1904 | Dieterich | 35/71 |
| 2,875,531 | 3/1959 | Mansfield | 35/69 |
| 3,222,597 | 12/1965 | Beatenbough et al. | 35/8 A X |
| 3,245,156 | 4/1966 | De Bloois et al. | 35/8 A |
| 3,514,873 | 6/1970 | Stobbe | 35/7 A X |
| 3,546,788 | 12/1970 | Drumm | 35/8 A |
| 3,593,433 | 7/1971 | Dillon et al. | 35/35 R |
| 3,665,618 | 5/1972 | Hahn | 35/35 H |
| 3,715,812 | 2/1973 | Novak | 35/35 J |
| 3,765,106 | 10/1973 | Cornell | 35/35 C |

*Primary Examiner*—Wm. H. Grieb
*Attorney, Agent, or Firm*—Hiram B. Gilson

[57] ABSTRACT

A language is introduced to the student in a twelve puzzle game board accompanied by an instructor's voice on a cassette tape giving instructions and presenting vocabulary to be learned. Each of the twelve puzzles is an animal to be assembled within a given space of time, the start of which is signaled by a whistle on a tape. Then the name of the animal is given in Spanish, the clue as to what the animal is (e.g., El perro dice bow-bow), and the color of the animal. The object of the game is to eventually be able to assemble each puzzle in the time allotted. A combination of audio, visual, tactile, and association learning methods is applied.

7 Claims, 4 Drawing Figures

EL PERRO la cabra
 la gallina
 la zorra
 la rana
 la abeja
 la vaca
 el gato
 el burro
 el gallo
 el perro
 el cerdo
 el pato

TEACHING GAME

BACKGROUND OF THE INVENTION

The search for the most efficient means for teaching is never-ending. The tools for accomplishing efficient teaching consist of the five senses: sight, hearing, touch, taste, and smell. It has been said by highly qualified educators that 87 per cent of what we learn we learn by sight and 7 per cent by what we hear. The remainder of learning potential resides in the remaining three senses, of which the most important is touch insofar as this invention is concerned.

It is apparent from the foregoing that the educator must be concerned first with efficient use of sight and sound. Now consider the sense of touch, the tactile aspect of learning, which was neatly phrased by Meredith, "Touch with thrilling fingers."

The most important part of successful language study is an understanding of other people's patterns of speech. It is important to see, for example, how the Spanish speak, and feel how they would say something. Therefore, it is seen desirable to develop familiarity with speech patterns in the language being studied, rather than depend on merely studying vacabulary. A final object in the conception of an efficient language learning system is to develop a favorable attitude of desire and enjoyment; that is, to make a game out of the learning process, and to present a challenge to the student. The instant invention accomplishes the foregoing objectives.

The prior art areas of search which were found to be most pertinent were class 35 - subclass 8, and design class 34. U.S. Pat. No. 3,546,788 discloses an audiovisual teaching system for children whereby they learn to tie shoelaces. No language teaching is involved and no game combination is disclosed. U.S. Pat. No. 3,765,106 discloses a foreign language teaching system including a cassette which reproduces lesson information in the form of foreign language correctly pronounced to be learned at predetermined spaced intervals of time, and a student repeater cassette. This invention is restricted to audiovisual only. U.S. Pat. No. 3,715,812 covers a color coded pronunciation symbol system which is audiovisual only. U.S. Pat. No. 3,665,618 discloses game boards with cutouts which receive instructional cards. None of these patents, or combination thereof, anticipate the combination of the subject invention.

SUMMARY

The invention comprises a twelve-puzzle game board of twelve windows arranged in rows and columns, each window is recessed into the board, and each window contains a five-piece jigsaw puzzle illustrating a dog, a cat, a frog, a goat, a pig, a donkey, a bee, a chicken, a duck, a rooster, a cow, and a fox. Each of the twelve five-piece picture puzzles is an animal or insect to be assembled within twenty-five seconds signaled by a whistle sounded by the cassette which also gives introductory instructions in English and the vocabulary is recited in Spanish to be learned. As the player assembles the puzzle and listens for the whistle, the name of the animal is given, the clue as to what the animal is, for example, "El perro dice bow-wow," and the color of the animal are recited in Spanish. The object of the game is to eventually be able to assemble each puzzle in the allotted time of twenty-five seconds per window. The tape is replayed and the player completes the placement of the remaining pieces for each window. The tape is not stopped.

In one example tested, the dialogue is actually presented by a ten year old bi-lingual child. In using a child's voice, the child playing the game (the student) readily enters into a child-to-child relationship. A combination of audio, visual, tactile, and association learning methods is applied in this game. Much of the value lies in the fact that learning is realized without the frustrations of competition for the child plays alone. The student learns the colors, 12 nouns, two verbs, masculine and feminine articles, plus some sentence structure. The method and apparatus may be used for teaching scientific and other subjects as well.

DESCRIPTION OF THE PREFERRED EMBODIMENTS

A typical size of game board for practicing the invention is 16 inches × 21 inches, and formed of two layers of ⅛-inch Masonite. The first layer forms the base and the top layer has 4-inch × 4-inch windows cut out such that a 1-inch border is provided around each window. The two layers are glued together. It is seen that each window is recessed ⅛-inch. The recessed area then accommodates the jigsaw pieces. The bottom of each window may be composed of a magnetic material and the pieces may be of a magnetizable material so that the pieces may be held permanently in place when assembled. A small permanent magnet may be placed in the base of the window. In the 1-inch margin area above each window is labeled the name of the animal or insect in Spanish. The picture is preferably in color. Different foreign languages are applicable. Spanish is used here as an example. The first two columns from the left consist of masculine subjects, and the third and fourth columns represent feminine subjects.

Figure 1:
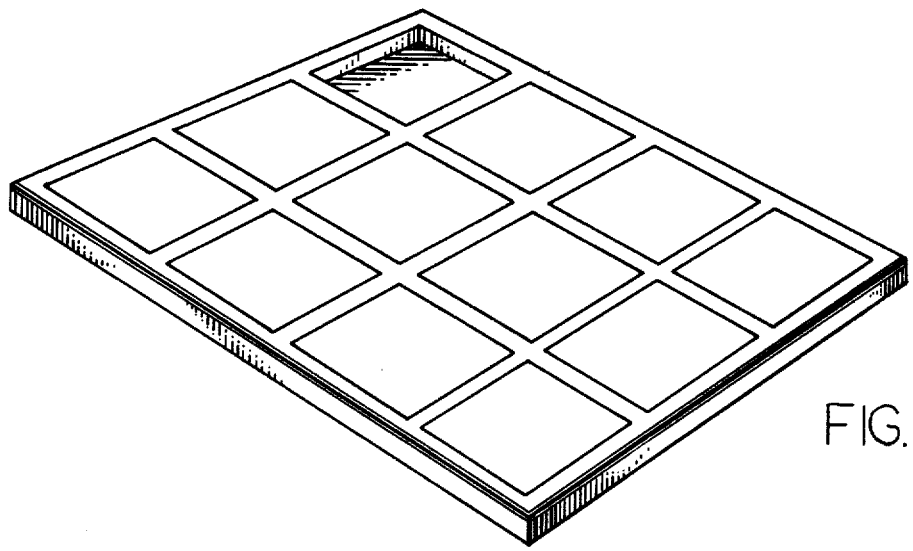
FIG. 1 is a perspective drawing of the game board with 12 windows in three rows of four windows per row.

In further reference to FIG. 1 is seen from left to right:

1st row - the dog (el perro), the cat (el gato), the frog (la rana), the goat (la cabra); 2nd row - the pig (el cerdo), the burro (el burro), the bee (la abeja), the hen (la gallina); 3rd row - the duck (el pato), the rooster (el gallo), the cow (la vaca), the fox (la zorra). Each window is recessed to accommodate the jigsaw pieces which when assembled present the picture preferably in color.

Figure 2:
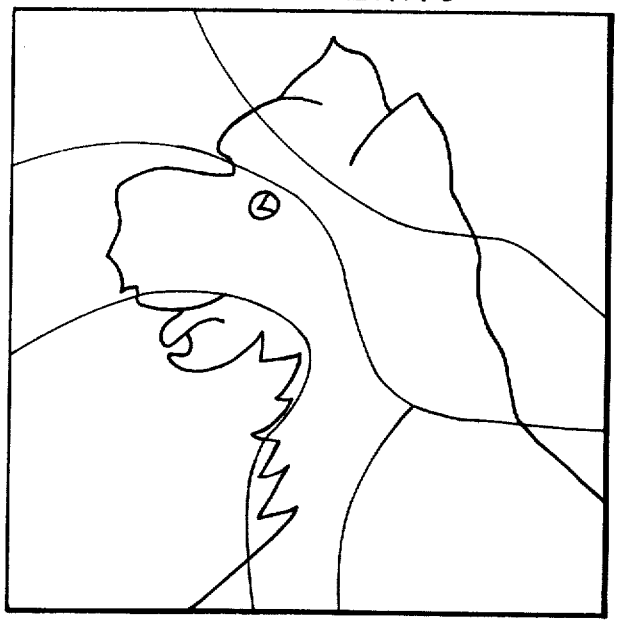
FIG. 2 is an enlarged view of FIG. 1 illustrating the jigsawed picture of the dog.

Shown in FIG. 2 is the random shape of the picture puzzle pieces, and each piece includes a part of the corresponding animal or insect and its color.

Figure 3:
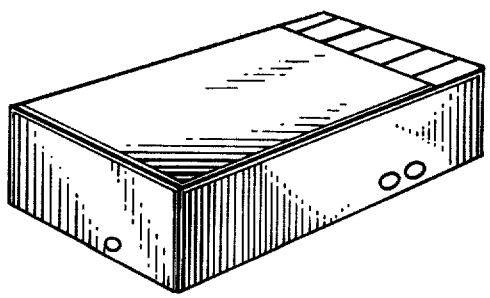
FIG. 3 illustrates a conventional cassette with tape for playback.

The cassette tape of FIG. 3 gives instructions to the student and automatically times the operation or step in the instruction sequence.

Figure 4:
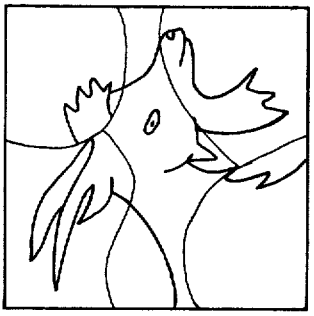
FIG. 4 shows an enlarged view of the board of FIG. 1 with the puzzle pieces in place.
Figure 4:
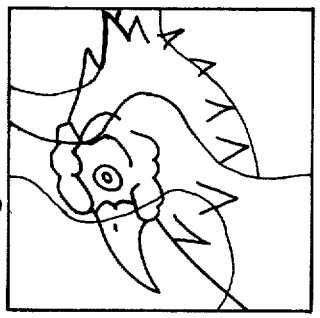
Figure 4:
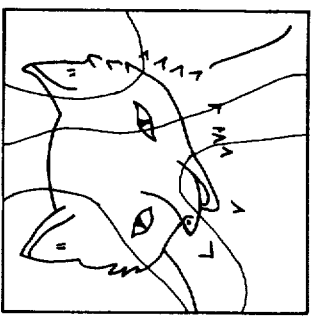
Figure 4:
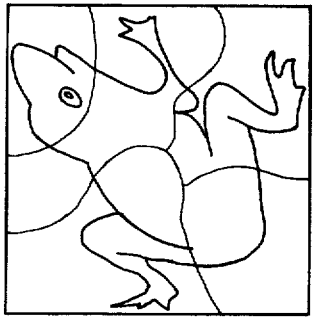
Figure 4:
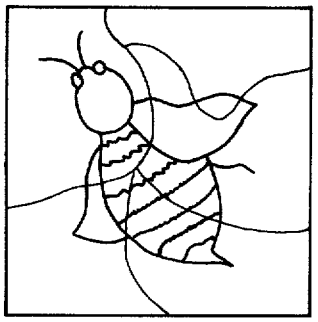
Figure 4:
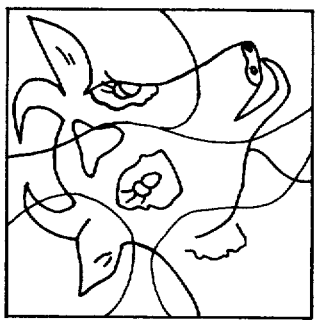
Figure 4:
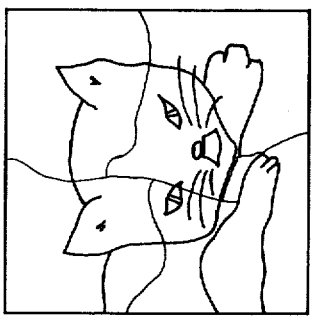
Figure 4:
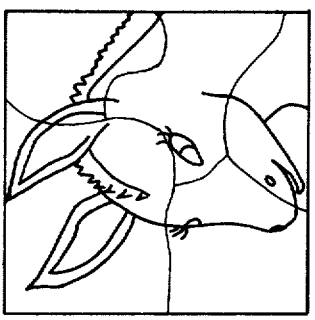
Figure 4:
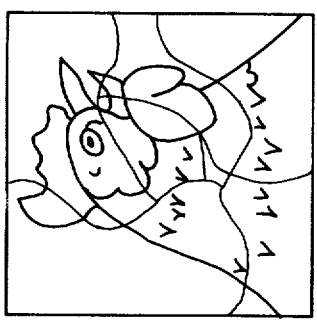
Figure 4:
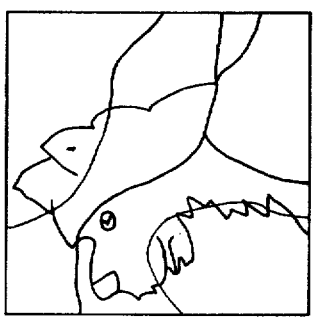
Figure 4:
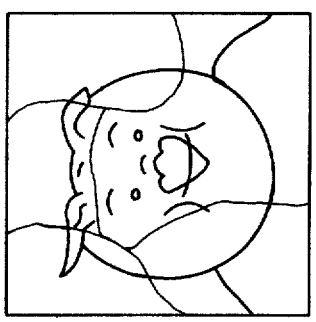
Figure 4:
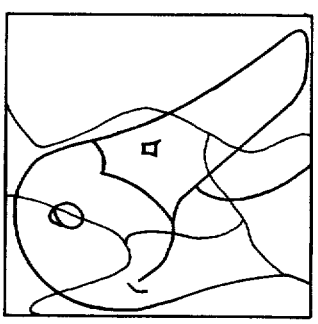

In FIG. 4, the first two columns from the left consist of masculine subjects, and the third and fourth columns represent feminine subjects.

The tape gives the student introductory instructions in English as to what the object of the lesson is and how it works. It tells the student when to start and when to stop for the time interval allotted for assembling the jigsaw pieces in each window. At the beginning the pieces most likely will not be completely assembled for each window. A child's voice is employed on the instruction tape to develop a child-to-child game relationship. The tape is never stopped until finished. The tape is re-run if necessary until the task can be completed in the allotted time. The student learns the colors, numbers to fifteen, twelve nouns, two verbs, masculine and feminine articles, plus some sentence structure. The student learns by discovery from the foreign language recitation what the subject is and its color, and by associating this information in selecting each piece and fitting it in place in its window. In performing this task, the three senses - sight, sound, and touch are employed in learning a foreign language.

While a presently preferred embodiment of the invention has been shown and described with particularity, it should be appreciated that various changes and modifications may be resorted to and may readily suggest themselves to those of ordinary skill in the art upon being apprised of the present invention. It is intended to encompass all such changes and modifications as fall within the scope and spirit of the appended claims.

I claim:

1. A teaching game method for learning Spanish by a student comprising the steps:
   a. providing a tape recording in English stating the object of the game and the procedure to be followed by the student;
   b. providing a series of whistle signals on the tape at spaced intervals;
   c. providing a game board containing a plurality of recessed windows;
   d. providing a plurality of picture puzzles, each puzzle comprising five pieces, each piece carrying a part of a picture of an animal;
   e. starting the tape recording;
   f. at the first whistle signal from the tape recording beginning the assembly of the first of said picture puzzles in the first window of said game board;
   g. simultaneously at said whistle signal, the name, sound, and color of the animal is recited from said tape recording in Spanish such that the student identifies the pieces for each window in order and learns the lesson with the placement of each piece;
   h. the tape renders a second whistle signal which terminates the time interval for the assembly of the five pieces in the first window;
   i. said second whistle signal starting the time interval for the assembly of the five pieces in the second window while the name, color, and sound of the animal is recited in Spanish;
   j. the tape renders a third whistle signal starting the assembly of a set of five pieces in the third window, the operation continuing in like manner until all of the windows have been worked in turn without stopping the tape, and;
   k. the tape being rewound and replayed in its entirety until each set of five pieces can be assembled in each respective window in twenty-five seconds.

2. A method according to claim 1 comprising the separate grouping of masculine nouns preceded by "el," and a second grouping of feminine nouns preceded by "la," whereby the student learns by discovery and association the difference between masculine and feminine gender.

3. A method according to claim 1 wherein the taped instructions in English and the recitation in Spanish are enunciated by a child to develop a child-to-child game relationship, with no pressure of competition being present.

4. A teaching game apparatus for the learning of the Spanish language by a student comprising in combination:
   a. a game board having a plurality of recessed windows arranged in rows and columns;
   b. a set of five jigsaw puzzle pieces for assembly into each window forming a complete colored picture of a subject such as an animal or an insect;
   c. each piece being selected to the lesson by a part of the picture of the subject in color;
   d. a tape recording cassette to be operated in conjunction with the game board;
   e. a tape to be played on said cassette, said tape having a series of signals thereon at spaced intervals;
   f. said tape also carrying a first section of introductory lesson instructions in English followed by a series of language teaching sections in Spanish;
   g. the tape time interval for each language teaching section being twenty-five seconds terminated by a signal; and
   h. each of the language teaching sections including a clue as to what the subject animal or insect is.

5. Apparatus according to claim 4 wherein the board has twelve windows in three rows of four windows per row, each window being surrounded by an adjacent margin.

6. Apparatus according to claim 4 wherein the Spanish name of each subject is placed in the margin above each window, the subjects being arranged in the windows according to either masculine or feminine gender, each subject name being preceded by its appropriate masculine or feminine article.

7. Apparatus according to claim 6 wherein the first two columns of six windows accommodate individual sets of five puzzle pieces each illustrating masculine subjects, and the second two columns of six windows accommodate individual sets of five puzzle pieces each illustrating feminine subjects.

* * * * *